L. J. BULLINGTON.
STRAINER FOR WATER PIPES UPON LOCOMOTIVES.
APPLICATION FILED SEPT. 15, 1914.
1,124,587.
Patented Jan. 12, 1915.
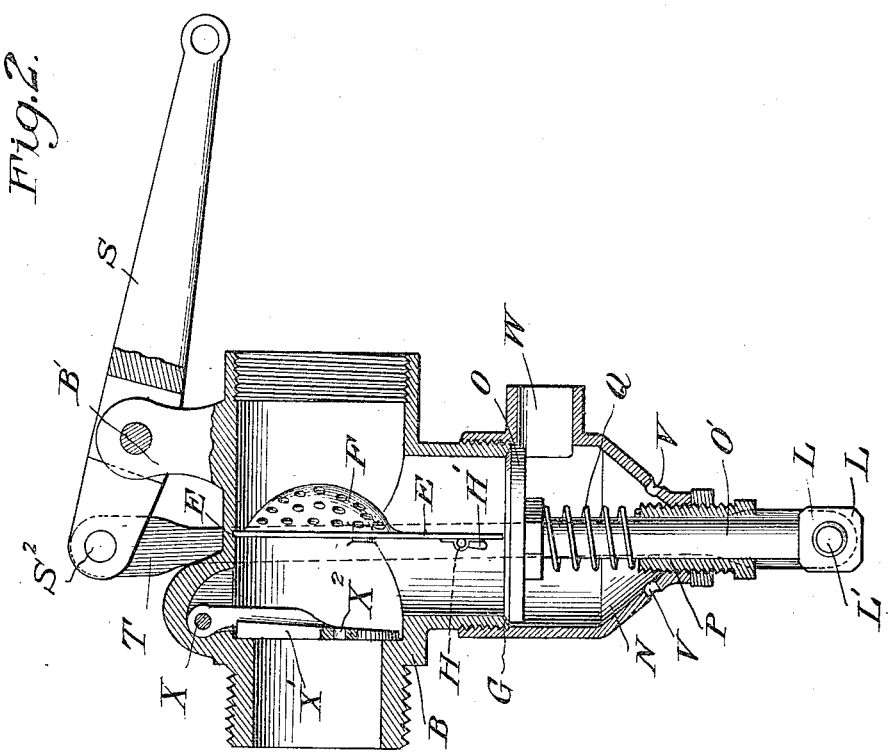
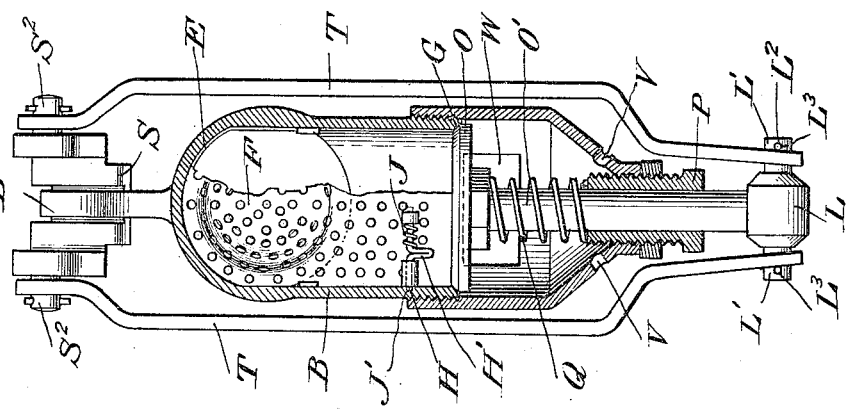
Witnesses
Fenton S. Belt
J. N. Sherwood
Inventor
L. J. Bullington
By Franklin H. Hough
Attorney

UNITED STATES PATENT OFFICE.

LAFAYETT J. BULLINGTON, OF NASHVILLE, ARKANSAS.

STRAINER FOR WATER-PIPES UPON LOCOMOTIVES.

1,124,587. Specification of Letters Patent. Patented Jan. 12, 1915.

Application filed September 15, 1914. Serial No. 861,883.

*To all whom it may concern:*

Be it known that I, LAFAYETT J. BULLINGTON, a citizen of the United States, residing at Nashville, in the county of Howard and State of Arkansas, have invented certain new and useful Improvements in Strainers for Water-Pipes upon Locomotives; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in strainer apparatus for use on locomotives for straining the water as it passes from the tender to the injector of the engine.

Another feature of the invention comprises means whereby the pipes through which the water is conveyed may in cold weather be prevented from freezing.

A further feature of the invention consists in the provision of means whereby the strainer within the valve casing may be conveniently cleaned of any trash which might lodge against the same.

The invention comprises various details of construction, combinations and arrangements of parts, which will be hereinafter fully described, shown in the accompanying drawings and then specifically defined in the appended claims.

My invention is illustrated in the accompanying drawings, in which:

Figure 1 is a sectional view vertically through the valve casing containing the strainer. Fig. 2 is a section taken in a plane at right angles to Fig. 1.

Reference now being had to the details of the drawings by letter, B designates a casing having oppositely disposed apertures to which communication may be had, preferably one with the tender of a locomotive and the other with a pipe leading to the ejector and which are not shown in the drawings. Said casing is provided on the inner surface thereof with oppositely disposed grooves E, and F designates a strainer, the marginal edge of which engages said groove, and H is a rocking spring-pressed latch which is mounted in suitable bearings upon the strainer and has a laterally projecting portion H' forming a handle. The spring J upon the latch is adapted to hold one end thereof in a hole J' formed in the surface of the casing. Said casing has a detachable part N which is threaded to the casing proper, and O is a valve mounted upon a stem O' which is journaled in suitable bearings in the lower detachable part of the casing, and a spring Q is interposed between the hub portion of the valve and a threaded plug P and serves to normally hold the valve in contact with the seat G. A nut L is fitted upon the lower threaded end of the stem of the valve and is provided with laterally projecting lugs L' and said lugs are apertured as at L² for the reception of keys L³. Pivotally mounted upon a lug B' projecting from the casing is a forked lever S, to which connections, not shown, are adapted to be had whereby the lever may be operated. A lug S² projects from each forked arm of the lever S, and T are bars pivotally connecting the lugs S² with said lugs L² and serve as means whereby, as the lever is tilted, the valve stem may be lowered for the purpose of allowing the valve upon the stem to unseat against the tension of said spring when it is desired to allow the water from the tender to cleanse any foreign matter or trash which might lodge against the face of the strainer. The lower portion of the casing, which is detachable, has an exit opening W through which the trash and water are allowed to make exit in cleansing the screen and drain apertures V are formed in the lower part of the detachable part of the casing.

Mounted upon a pivotal pin X within the casing is a valve X', having apertures X² therein, said apertures in the valve being provided for the purpose of allowing a small quantity of live steam to pass through the pipes and casing when it is desired to prevent the water from freezing in cold weather. The apertures being small in the valve would prevent an excessive amount of live steam passing through the pipes which might injure the same by excessive heat.

In operation, the parts being arranged as shown, water which may be drawn by suction through connections between the casing and the ejector of the engine will be strained before it enters the ejector casing and any trash that might be in the water will be lodged against the face of the screen. When it is desired to wash away any foreign matter which might lodge against the strainer, it may be done by the operator merely tilting the lever, causing the spring-pressed valve in the casing to open and allowing the water from the tank to rush by and carry with it any trash which might lodge against the screen, the water and trash making exit through the opening in the wall of the lower part of the casing.

In cold weather, steam may be introduced into the casing to prevent the water from freezing.

What I claim to be new is:

1. A strainer for water pipes upon locomotives comprising a casing having a detachable section, a valve regulating the passageway communicating with the detachable section, said casing having openings, one to receive a water supply pipe and the other a pipe adapted to lead to an injector, the inner wall of the casing having a groove, a screen mounted in said groove, a latch upon the screen engaging an indenture in the casing, a spring-pressed stem to said valve, a lever pivotally mounted upon the casing and having pivotal connections with said stem.

2. A strainer for water pipes upon locomotives comprising a casing having a detachable section, a valve regulating the passageway communicating with the detachable section, said casing having openings, one to receive a water supply pipe and the other a pipe adapted to lead to an injector, the inner wall of the casing having a groove, a screen mounted in said groove, a latch upon the screen engaging an indenture in the casing, a spring-pressed stem to said valve, a lever pivotally mounted upon the casing and having pivotal connections with said stem, and a valve pivotally mounted within the casing and having apertures therein.

In testimony whereof I hereunto affix my signature in presence of two witnesses.

LAFAYETT J. BULLINGTON.

Witnesses:
  W. J. SEPPARD,
  L. F. COUCH.

Copies of this patent may be obtained for five cents each, by addressing the "Commissioner of Patents, Washington, D. C."